(12) United States Patent (10) Patent No.: US 12,665,106 B2

Wilson et al. (45) Date of Patent: Jun. 23, 2026

(54) WATER SWELLABLE SEMI-CONDUCTIVE TAPE

(71) Applicant: DelStar Technologies, Inc., Alpharetta, GA (US)

(72) Inventors: Rebecca Wilson, Stalybridge (GB); Geoffrey Henstock, Greater Manchester (GB)

(73) Assignee: DelStar Technologies, Inc., Alpharetta, GA (US)

( * ) Notice: Subject to any disclaimer, the term of this patent is extended or adjusted under 35 U.S.C. 154(b) by 262 days.

(21) Appl. No.: 18/496,296

(22) Filed: Oct. 27, 2023

(65) Prior Publication Data

US 2024/0145126 A1      May 2, 2024

Related U.S. Application Data

(60) Provisional application No. 63/420,517, filed on Oct. 28, 2022.

(51) Int. Cl.
| | |
|---|---|
| *H01B 7/28* | (2006.01) |
| *C08K 3/04* | (2006.01) |
| *H01B 7/288* | (2006.01) |

(52) U.S. Cl.
CPC .............. *H01B 7/288* (2013.01); *C08K 3/04* (2013.01); *C08K 2201/001* (2013.01); *C08K 2201/005* (2013.01)

(58) Field of Classification Search
CPC . H01B 7/045; H01B 7/18; H01B 7/22; H01B 7/28; H01B 7/282; H01B 7/285; H01B 7/288; H01B 7/2825; H01B 7/34; H01B 9/02; H01B 11/06; H01B 13/32; H01B 13/321; C08K 3/04; C08K 2201/001; C08K 2201/005

USPC ............ 174/23 C, 23 R, 34, 102 R, 102 SC, 174/102 SP, 105 SC, 106 SC, 106 R, 107, 174/108, 109, 115, 116, 121 A, 121 R; 428/383, 420, 516, 518
See application file for complete search history.

(56) References Cited

U.S. PATENT DOCUMENTS

| | | | | | |
|---|---|---|---|---|---|
| 4,501,928 | A | * | 2/1985 | Ishitobi | .................... B32B 1/00 |
| | | | | | 174/110 V |
| 4,621,169 | A | * | 11/1986 | Petinelli | ............. H01B 11/1058 |
| | | | | | 174/23 C |

(Continued)

FOREIGN PATENT DOCUMENTS

| | | | |
|---|---|---|---|
| WO | 9933070 | A1 | 7/1999 |
| WO | 2018090639 | A1 | 5/2018 |
| WO | 2021094782 | A1 | 5/2021 |

OTHER PUBLICATIONS

International Search Report and Written Opinion; International Application No. PCT/US2023/078043; Feb. 12, 2024.

(Continued)

*Primary Examiner* — William H. Mayo, III

(74) *Attorney, Agent, or Firm* — Farber LLC

(57) ABSTRACT

A water swellable semi-conductive material having a semi-conductive layer and a semi-conductive water swellable polymeric layer which is positioned on opposing surfaces of the semi-conductive layer is provided. The semi-conductive water swellable polymeric layer is composed of conductive particles dispersed within a crosslinked superabsorbent polymeric matrix.

24 Claims, 2 Drawing Sheets

(56) References Cited

U.S. PATENT DOCUMENTS

| | | | | |
|---|---|---|---|---|
| 4,703,134 | A * | 10/1987 | Uematsu | H01B 7/285 |
| | | | | 174/106 SC |
| 4,731,504 | A * | 3/1988 | Achille | H01B 7/295 |
| | | | | 174/105 R |
| 5,010,209 | A * | 4/1991 | Marciano-Agostinelli | |
| | | | | H01B 9/02 |
| | | | | 174/23 C |
| 5,281,757 | A * | 1/1994 | Marin | H01B 9/022 |
| | | | | 174/106 SC |
| 5,310,964 | A * | 5/1994 | Roberts | G02B 6/4436 |
| | | | | 174/106 SC |
| 5,451,718 | A * | 9/1995 | Dixon | H01B 7/288 |
| | | | | 174/23 R |
| 6,455,769 | B1 | 9/2002 | Belli et al. | |
| 7,567,739 | B2 | 7/2009 | Overton et al. | |
| 10,128,023 | B2 * | 11/2018 | Olsen | H01B 7/2825 |
| 2002/0172477 | A1 | 11/2002 | Quinn et al. | |
| 2008/0161499 | A1 | 7/2008 | Riegel et al. | |
| 2011/0176782 | A1 * | 7/2011 | Parris | G02B 6/4494 |
| | | | | 385/113 |
| 2012/0000690 | A1 * | 1/2012 | Van Der Meer | H01B 7/2825 |
| | | | | 174/102 R |
| 2012/0080213 | A1 * | 4/2012 | Furuheim | H01B 7/28 |
| | | | | 174/106 R |
| 2013/0043438 | A1 | 2/2013 | Moss et al. | |
| 2014/0326478 | A1 | 11/2014 | Maioli et al. | |
| 2018/0047481 | A1 * | 2/2018 | Dalin | H01B 7/2825 |
| 2020/0088967 | A1 * | 3/2020 | Bookbinder | G02B 6/4433 |
| 2020/0255333 | A1 * | 8/2020 | Cao | C03C 25/285 |
| 2020/0312488 | A1 | 10/2020 | De Rai | |
| 2021/0252476 | A1 | 8/2021 | Carus et al. | |
| 2022/0250912 | A1 | 8/2022 | Prada Silvy et al. | |

OTHER PUBLICATIONS

Zhang, et al., Study on drying performance of high voltage cable buffer layer material. METAC Web Conference. Mar. 14, 2022. [Feb. 4, 2024]. Retrieved from internet: <https://www.matec-conferences.org/articles/matecconf/abs/2022/03/matecconf_aepee22_01002/matecconf_aepee22_01002.html>.

Isha Meshram, et al., Super-Absorbent Polymer: A Review on the Characteristics and Application, International Journal of Advanced Research in Chemical Science, 2020, pp. 8-21, vol. 7, Issue 5.

* cited by examiner

WATER SWELLABLE SEMI-CONDUCTIVE TAPE

CROSS-REFERENCE TO RELATED APPLICATIONS

This application claims the benefit of U.S. Provisional Application No. 63/420,517 filed on Oct. 28, 2022, the complete disclosure of which is incorporated herein by reference for all purposes.

TECHNICAL FIELD

Semi-conductive tapes, particularly to semi-conductive tapes for use with electric cables, such as power cables, and more particularly water swellable semi-conductive tapes, are described herein.

BACKGROUND

Water swellable, also referred to as water blocking, tapes are commercially available, such as a three-layer tape composed of a polyester non-woven fabric as outer layers and a superabsorbent powder as a middle layer. An exemplary three-layer water blocking tape is shown in FIG. 1. When water enters into a cable protected by water blocking (water swellable) tape, the super-absorbent component within the tape rapidly absorbs the water and quickly swells to block any further ingress. This minimizes and localizes any cable damage due to water and to aid in repair. Water blocking tape is widely used in various cables and other applications.

Semi-conductive tapes are made from a substrate coated on one or both sides with a semi-conductive compound. These tapes help to equalize the field current around power conductors or cores, and ensure electrical contact with the earthing system, which reduces the electrical stress on the insulation material and enhances performance. Semi-conductive tapes can also be used to prevent electrolytic corrosion of metallic layers in high voltage cables.

Variations of water swellable tapes including water swellable semi-conductive tapes are known in the art. Examples of such tapes include a three-layer water-swellable tape adhered to a semi-conductive tape to form a two-tape composite, and sandwiching powdered super absorbent polymer mixed with carbon black between non-woven fabric. However, known water-swellable semi-conductive tapes can have an undesirable thickness, e.g., >0.25 mm, and/or are not as conductive as a semi-conductive grade tape.

Therefore, there is a need in the art for a water-swellable semi-conductive tape with a reduced thickness and increased conductive performance.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

In accordance with an aspect of the disclosure, a water swellable semi-conductive material is provided with reduced thickness and superior performance. The water swellable semi-conductive material is comprised of a substrate with first and second semi-conductive layers positioned on opposing surfaces of the substrate. A semi-conductive water swellable layer is positioned on one of the first or second semi-conductive coatings to form a multi-layer structure. The semi-conductive water swellable polymeric layer is a crosslinked superabsorbent polymeric matrix having conductive particles dispersed within the polymeric matrix. The conductive particles can be carbon black particles, or other suitably conductive particles. The conductive particles are dispersed within the cross-linked acrylate polymer matrix to form a conductive pathway within the cross-linked acrylate polymer matrix.

The water swellable semi-conductive material can be in the form of a multi-layer tape, where the substrate is an elongated material of varying size and materials, such as a non-woven, or woven fabric, including a woven polymer fabric such as nylon 6,6. In one embodiment, the water swellable semi-conductive material as described herein is positioned in connection with a conductor to form a water-resistant cable, such as an electrical cable. In other embodiments, the conductor is an electrical cable and the water swellable semi-conductive material is in the form a tape applied to the electrical cable.

According to another aspect of the disclosure, a method of making a water swellable semi-conductive material is provided. The method comprises applying a semi-conductive coating to a substrate to form a semi-conductive substrate. An aqueous composition comprising an acrylate polymer or acrylate pre-polymer and conductive particles is then applied to the semi-conductive substrate followed by drying and curing the aqueous composition on the semi-conductive substrate, whereby the acrylate polymer or acrylate pre-polymer undergoes cross-linking to form a semi-conductive water swellable polymeric layer positioned on the semi-conductive substrate. Upon drying and curing, the semi-conductive water swellable polymeric layer is comprised of a crosslinked superabsorbent polymer matrix having conductive particles dispersed therein.

The aqueous composition can be applied to one side of the substrate. In some embodiments, the aqueous composition can be applied to both sides of the substrate. In other embodiments, the aqueous composition comprises separate components that are mixed together prior to application.

It is to be understood that both the foregoing general description and the following detailed description are exemplary and explanatory only and are not restrictive of the disclosure. Additional features of the disclosure will be set forth in part in the description which follows or may be learned by practice of the disclosure.

BRIEF DESCRIPTION OF THE DRAWINGS

The accompanying drawings, which are incorporated in and constitute a part of this specification, illustrate several embodiments and together with the description serve to explain certain principles.

DETAILED DESCRIPTION

Figure 1:
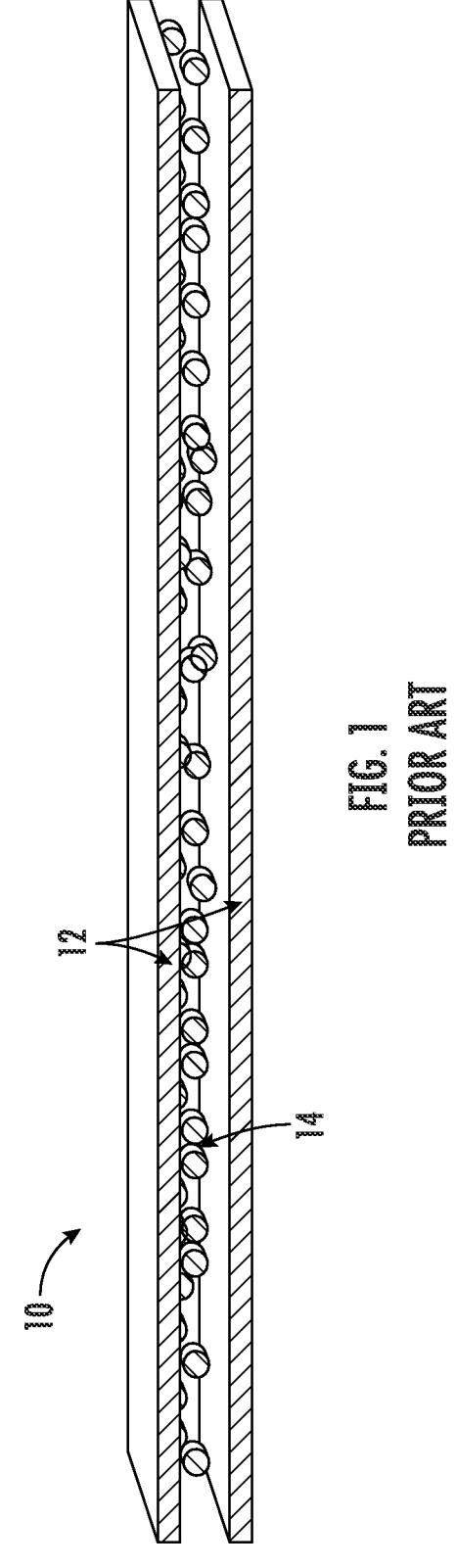
FIG. 1 is an illustration of a prior art water swellable tape.

This description and the accompanying drawings illustrate exemplary embodiments and should not be taken as limiting, with the claims defining the scope of the present disclosure, including equivalents. Various mechanical, compositional, structural, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment. Moreover, the depictions herein are for illustrative purposes only and do not necessarily reflect the actual shape, size, or dimensions of the system or illustrated components.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

Except as otherwise noted, any quantitative values are approximate whether the word "about" or "approximately" or the like are stated or not. The materials, methods, and examples described herein are illustrative only and not intended to be limiting.

In accordance with an aspect of the disclosure, a water swellable semi-conductive (SC) material is provided. The material can be incorporated into a tape or cable wrapping for various conductors, including cables, and used in other applications such as jointing and protection. The water swellable semi-conductive material as described herein effectively absorb water and quickly swell to block ingress of water, as well as promoting good electrical contact. In some embodiments, the water swellable semi-conductive tapes can be used to prevent electrolytic corrosion of metallic layers in in medium to extra high voltage cables. The water swellable material can also be used to equalize the field current around power conductors or cores, and ensure electrical contact with the earthing system, which reduces the electrical stress on the insulation material and enhances performance.

According to one embodiment, the water swellable semi-conductive material comprises a tape. The water swellable semi-conductive tape comprises a semi-conductive substrate, such as a woven substrate (typically nylon). A semi-conductive water swellable layer is positioned on an outer surface of the semi-conductive substrate. In addition to the benefits described above, the water swellable semi-conductive tape according to the description has many physical and electrical properties for a wide variety of cable manufacturing applications. Some of the features and benefits of the water swellable semi-conductive tape are: high abrasion resistance, excellent fire performance, high speed application, halogen-free, high electrical conductance, reduced slippage, highly conformable, and good long-term temperature stability. In addition, the semi-conductive water swellable tape according to the description has a 50% reduction in thickness over conventional cable wrappings.

According to one embodiment, a water swellable semi-conductive polymeric material is provided. The water swellable semi-conductive polymeric material comprises conductive particles dispersed within a crosslinked superabsorbent polymeric matrix.

Water swellable superabsorbent polymers (SAP) are a class of polymers that are able to absorb large amount of water. Generally speaking, SAPs consist of a network of cross-linked polymer chains that diffuse water within the polymer network where it is stored. The type and degree of crosslinking governs the ability of the superabsorbent polymer to absorb and retain a large volume of water. Examples of suitable superabsorbent polymers are water borne solutions of acrylate polymers and prepolymers formed from water soluble monomers such as acrylic, meth acrylic acid, and 2-acrylamide (DAA) 2-methylpropanesulfuric acid. Other co-monomers such as acrylamide and N-isopropyl acrylamide can also be incorporated into the SAP. Examples of cross-linkers include a variety of multifunctional monomers. They can be di-, tri-, or tetra functional, and can have mixed type of polymerizable groups such as methacrylate.

According to one embodiment, the crosslinked superabsorbent polymeric matrix is a cross-linked acrylate polymer. The cross-linked acrylate polymer may be formed by applying a water-based acrylate polymer or pre-polymer (i.e., liquid SAP) to a substrate and curing by application of heat. When cured, the acrylate polymer or pre-polymer undergoes chemical crosslinking to form the crosslinked superabsorbent polymeric matrix. Suitable water borne solutions of acrylate polymers include Aquaswell 50, Aquaswell 75, and Aquaswell 100, commercially available from H&R ChemPharm (UK) Ltd. (Tipton, West Midlands, United Kingdom). Suitable crosslinked superabsorbent polymers formed on a substrate can also have a binding effect. In one particular embodiment, the liquid SAP may be provided in two parts and mixed prior to use, in order to improve stability in large amounts.

The water swellable semi-conductive polymeric material has conductive particles dispersed within the crosslinked superabsorbent polymeric matrix. In some embodiments, the conductive particles are combined with a water borne acrylate polymer or pre-polymer prior in solution and applied to a substrate. Upon curing, the semi-conductive particles are dispersed within the cross-linked acrylate polymer matrix to form a conductive pathway within the cross-linked acrylate polymer matrix. In some embodiments, the conductive particles comprise carbon black particles. In one embodiment, the conductive particles are carbon black, present in the aqueous composition an amount from 5 percent by weight to 50 percent by weight, and optimally about 25 percent by weight. An example of suitable carbon black particles include granular activated carbon having a mesh size of 0.06-0.25 mm, such as Filtracarb® FY5 30×60, commercially available from CPL Industries LTD (Killamarsh, Sheffield, United Kingdom).

According to another embodiment, a water swellable semi-conductive material is provided. The water swellable semi-conductive material comprises a semi-conductive substrate with the semi-conductive water swellable polymeric material positioned on the semi-conductive substrate.

In one embodiment, the substrate has first and second semi-conductive layers positioned on the surface of the substrate. The substrate may be a cloth, such as non-woven, or woven fabric. A variety of materials can be used as the substrate including polymeric materials such as nylon and polyester, and other suitable materials such as woven glass, hessian and cotton. In one embodiment, the substrate is nylon 6,6. The semi-conductive layers are positioned on the surface of the substrate either by application of a semi-conductive liquid mixture to the surface, in one or more applications which coat the surface of the substrate. The surface is coated on one side of the substrate. Of course, it is contemplated that in some embodiments, the surface may be coated on both (opposing) sides of the substrate. Furthermore, the substrate can be coated more than once depending on the desired weight and product specifications. When multiple coats are applied, the coating is dried after each coat. The first and second semi-conductive layers can also be applied by impregnation of the substrate with a semi-conductive liquid mixture, followed by drying.

In one embodiment, the semi-conductive layers comprise carbon black particles applied to the substrate in an aqueous mixture followed by drying. The aqueous mixture of semi-conductive particles can include various additives to aid in application of the particles, such as latex, dispersing agents, and stabilizers. In one embodiment, the aqueous mixture of semi-conductive particles is a mixture of carbon black particles in an aqueous solution, with water, latex, and dispersing agents and stabilizers. In another embodiment, the carbon black particles in the aqueous mixture have a particle size from about 150 μm to about 400 μm.

In some embodiments, the weight of the water swellable semi-conductive material conforms to the specifications shown in Table 1 below:

inner core, with a water swellable semi-conductive material placed in connection with the conductor inner core. The water swellable semi-conductive material has a substrate 104, with first and second semi-conductive coatings 106 positioned on opposing sides of the substrate and around the inner core. A semi-conductive water swellable polymeric layer 108 is positioned on an outer surface of the first or second semi-conductive coatings 106. Other layers can include protective coverings or sheaths. In some embodiments, the conductor is an electrical cable, and in other embodiments, the conductor is an electrical cable and the water swellable semi-conductive material is in the form a tape applied to the electrical cable.

According to another embodiment, a method of making a water swellable semi-conductive material is provided. The method comprises providing a substrate as described herein. A semi-conductive coating is applied to the substrate to form a semi-conductive layer on the substrate. The semi-conductive coating may be applied as an aqueous mixture of semi-conductive particles and dried to form the layer. The particles may be applied to the surface or embedded (impregnated) in the substrate. An aqueous composition comprising an acrylate polymer or acrylate pre-polymer and

TABLE 1

| Specification | Range | Optimal | Testing Standard |
|---|---|---|---|
| Weight (gsm) | <100; 70-90; | 74-86 | BS EN ISO 2286 -2* |
| Thickness (mm) | <0.38; <0.26 | <0.11 | BS EN ISO 2286 -3* |
| Tensile (N/cm) | <50 | >100 | BS EN ISO 1421* |
| Elongation (%) | <20 | >20 | BS EN ISO 1421* |
| Swelling height fresh water after 10 mins (mm) | ≥4 | | HD 605 S2: 2008 chapter 2.5.9** |
| Swelling height salt water (3.5% NaCl) after 10 mins (mm) | ≥.7 | 0.56 | HD 605 S2: 2008 chapter 2.5.9** |
| Surface Resistance (Ω/Sq) | ≤500 | ≤200 | |
| Volume Resistance | <0.08 | <0.05 | |
| Through Resistivity (Ωm) | <20 | <5 | |

*BSI Standard
**Chapter 2.5.9 of the harmonization document HD 605 S2: 2008

Figure 2:
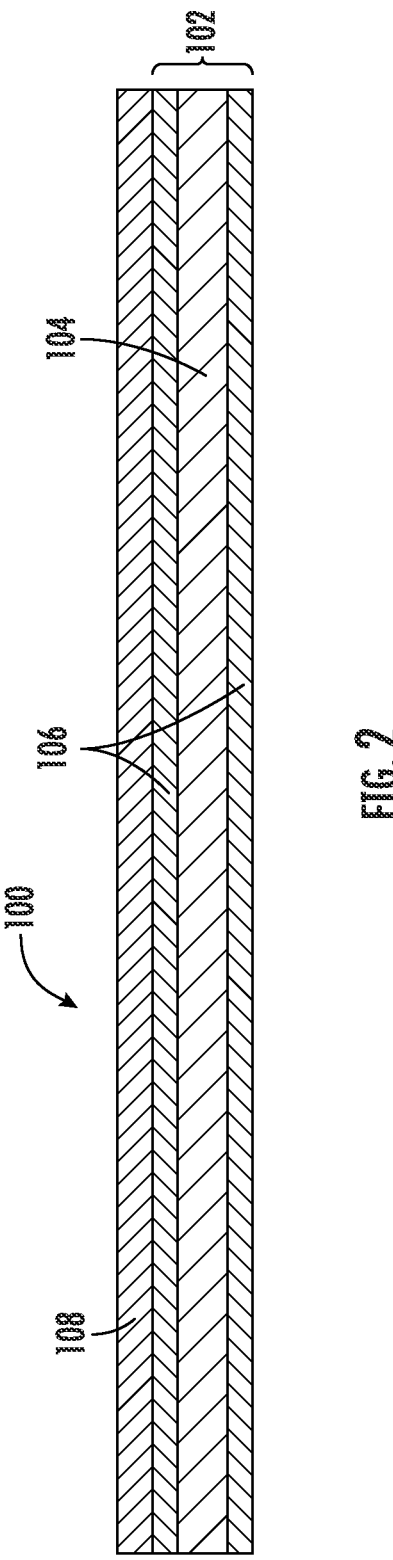
FIG. 2 is a side-view illustration of an embodiment of a water-swellable semi-conductive (SC) tape according to the disclosure.

Referring now to FIG. 2, a water swellable semi-conductive multi-layer tape 100 is shown. The multi-layer tape 100 has a first layer 102, comprising a substrate 104, and first and second semi-conductive layers 106. A second layer 108 comprising the semi-conductive water swellable polymeric material is positioned on one of the first or second semi-conductive layers 106. In one embodiment, the substrate 104 is an elongated material having first and second opposing surfaces, and the first and second semi-conductive layers 106 are positioned on the first and second opposing surfaces of the woven substrate 102, as shown.

The water swellable semi-conductive tape according to the disclosure can be made from a wide variety of substrate materials, as described herein, and have a wide variety of widths, lengths, and thicknesses, and the tape can be made in the form of pads or long length spools, in varying widths.

In another embodiment, a water-resistant conductor is provided. The water-resistant conductor has a conductor conductive particles is then applied to the semi-conductive substrate. The aqueous composition on the semi-conductive substrate is then dried and cured thereby cross-linking the acrylate polymer or acrylate pre-polymer to form a water swellable semi-conductive polymeric layer positioned on the semi-conductive substrate. The water swellable semi-conductive polymeric layer is comprised of a crosslinked superabsorbent polymer matrix having conductive particles dispersed therein.

EXAMPLES

Trial samples and lab samples of the water swellable semi-conductive tape was prepared as described herein. The samples were analyzed according to the testing protocols indicated in Table 2. Data from the trial samples is more reliable than the lab samples, as the lab samples were handmade (A4) lab samples. Test data for the Trial and Lab Samples is shown in comparison to a competitor product.

TABLE 2

| Test | Trial Samples | Lab Samples | Competitor Result (TDS) |
|---|---|---|---|
| Weight (gsm) | 86 (BS EN ISO 2286 -2) * | 74 (BS EN ISO 2286 -2) * | 102 (ISO 9073-1) |
| Thickness (mm) | 0.112 (BS EN ISO 2286 -3) * | 0.104 (BS EN ISO 2286 -3) * | 0.5 (ISO 9073-2) |
| Tensile (N/cm) | 110 (BS EN ISO 1421) * | N/A | 50 (ISO 9073-3) |
| Elongation (%) | >20 (BS EN ISO 1421) * | N/A | 13 (ISO 9073-3) |
| Swelling height fresh water after 10 mins (mm) | — | — | Assumed fresh water 12 mm/2 min (internal) |
| Swelling height salt water (3.5% NaCl) after 10 mins (mm) | 0.56 (HD 605 S2: 2008 chapter 2.5.9) ** | 0.7 (HD 605 S2: 2008 chapter 2.5.9) ** | — |
| Surface Resistance (Ω/Sq) | 198 | 490 | 500 |
| Volume Resistance | 0.04 | 0.08 | 0.1 |
| Through Resistivity (Ωm) | 4.4 | 20 | — |

* BSI Standard
** Chapter 2.5.9 of the harmonization document HD 605 S2: 2008

While the foregoing written description enables one of ordinary skill to make and use what is considered presently to be the best mode thereof, those of ordinary skill will understand and appreciate the existence of variations, combinations, and equivalents of the specific embodiments, methods, and examples herein. Other embodiments will be apparent to those skilled in the art from consideration of the specification and practice of the embodiments disclosed herein. It is intended that the specification and examples be considered as exemplary only, with a true scope and spirit of the embodiment being indicated by the following claims.

For example, according to one aspect, in a $1^{st}$ embodiment, a water swellable semi-conductive material is provided. The material may comprise a substrate, first and second semi-conductive layers positioned on opposing surfaces of the substrate, and a semi-conductive water swellable layer positioned on an outer surface of one of the first or second semi-conductive coatings, the semi-conductive water swellable polymeric layer comprising conductive particles dispersed within a crosslinked superabsorbent polymeric matrix.

A $2^{nd}$ embodiment is the $1^{st}$ embodiment of the water swellable semi-conductive material, wherein the conductive particles comprise conductive carbon black particles.

A $3^{rd}$ embodiment is any combination of the first 2 embodiments, wherein the conductive particles comprise carbon black particles having a particle mesh of about 0.06 to 0.25 mm.

A $4^{th}$ embodiment is any combination of the first 3 embodiments, wherein the crosslinked superabsorbent polymeric matrix comprises a cross-linked acrylate polymer.

A $5^{th}$ embodiment is any combination of the first 4 embodiments, wherein the superabsorbent polymeric matrix comprises a cross-linked acrylate polymer matrix and the conductive particles comprise carbon black particles, and wherein the black particles are dispersed within the cross-linked acrylate polymer matrix to form a conductive pathway within the cross-linked acrylate polymer matrix.

A $6^{th}$ embodiment is any combination of the first 5 embodiments, wherein the superabsorbent polymer matrix is a coating positioned on top of the first or second semi-conductive coating.

A $7^{th}$ embodiment is any combination of the first 6 embodiments, wherein the semi-conductive water swellable polymeric layer is formed from application of an aqueous composition comprising an acrylate polymer or acrylate pre-polymer and the conductive particles to the first or second semi-conductive coating, followed by drying the aqueous composition to form the superabsorbent polymer matrix having conductive particles dispersed therein.

An $8^{th}$ embodiment is any combination of the first 7 embodiments, wherein the conductive particles are carbon black, present in the aqueous composition an amount from 5 percent by weight to 50 percent by weight.

A $9^{th}$ embodiment is any combination of the first 8 embodiments, wherein the conductive particles are carbon black, present in the aqueous composition an amount of about 25 percent by weight.

A $10^{th}$ embodiment is any combination of the first 9 embodiments, wherein the first and second semi-conductive layers comprise carbon black particles.

An $11^{th}$ embodiment is any combination of the first 10 embodiments, wherein the first and second semi-conductive layers comprise carbon black particles having a particle size of about 150 μm to about 400 μm.

A $12^{th}$ embodiment is any combination of the first 11 embodiments, wherein the substrate is impregnated with super conductive particles to form the first and second semi-conductive layers positioned on opposing surfaces of the woven substrate.

A $13^{th}$ embodiment is any combination of the first 12 embodiments, wherein the water swellable semi-conductive material is a multi-layer tape, and the multi-layer tape comprises a first layer comprising the substrate and the first and second semi-conductive layers. The substrate may be an elongated material. The elongated material may have first and second opposing surfaces. The first and second semi-conductive layers may be positioned on the first and second opposing surfaces of the woven substrate. The tape may further comprise a second layer comprising the semi-conductive water swellable polymeric layer. The second layer may be positioned on one of the first or second semi-conductive layers.

A $14^{th}$ embodiment is any combination of the first 13 embodiments, wherein the elongated material is a woven fabric.

A $15^{th}$ embodiment is any combination of the first 14 embodiments, wherein the elongate material is a polymeric material.

In a second aspect, a $1^{st}$ embodiment of a water-resistant cable is provided. The water-resistant cable may comprise a conductor, a water swellable semi-conductive material placed in connection with the conductor, the water swellable semi-conductive material comprising a substrate having first and second opposing faces, first and second semi-conductive coatings positioned on opposing faces of the woven substrate and a semi-conductive water swellable polymeric layer positioned on an outer surface of one of the first or second semi-conductive coatings, the semi-conductive water swellable polymeric layer comprising conductive particles dispersed within a superabsorbent polymeric matrix.

A $2^{nd}$ embodiment is the $1^{st}$ embodiment of the water-resistant cable, wherein the conductor is an electrical cable.

A $3^{rd}$ embodiment is any combination of the first 2 embodiments, wherein the conductor is an electrical cable, and the water swellable semi-conductive material is in the form a tape applied to the electrical cable.

In a third aspect, a $1^{st}$ embodiment of a method of making a water swellable semi-conductive material is provided. The method may comprise providing a substrate; applying a semi-conductive coating to the substrate to form a semi-conductive substrate; applying an aqueous composition comprising an acrylate polymer or acrylate pre-polymer and conductive particles to the semi-conductive substrate; and drying the aqueous composition on the semi-conductive substrate and cross-linking the acrylate polymer or acrylate pre-polymer to form a semi-conductive water swellable polymeric layer positioned on the semi-conductive substrate, wherein the semi-conductive water swellable polymeric layer is comprised of a crosslinked superabsorbent polymer matrix having conductive particles dispersed therein.

A $2^{nd}$ embodiment is the $1^{st}$ embodiment of the method, wherein the semi-conductive coating is applied to opposing surfaces of the substrate as a coating.

A $3^{rd}$ embodiment is any combination of the first 2 embodiments, wherein the semi-conductive coating is impregnated within the substrate.

A $4^{th}$ embodiment is any combination of the first 3 embodiments, wherein the aqueous composition is applied to one side of the substrate.

A $5^{th}$ embodiment is any combination of the first 4 embodiments, wherein the aqueous composition is applied to both sides of the substrate.

A $6^{th}$ embodiment is any combination of the first 5 embodiments, wherein the aqueous composition comprises separate components that are mixed together prior to application.

What is claimed is:

1. A water swellable semi-conductive material comprising:
   a substrate;
   first and second semi-conductive layers positioned on opposing surfaces of the substrate; and
   a semi-conductive water swellable polymeric layer positioned on an outer surface of one of the first or second semi-conductive layers, the semi-conductive water swellable polymeric layer comprising conductive particles dispersed within a crosslinked superabsorbent polymeric matrix, wherein the conductive particles comprise carbon black particles having a particle mesh of about 0.06 mm to about 0.25 mm.

2. The water swellable semi-conductive material according to claim 1, wherein the crosslinked superabsorbent polymeric matrix comprises a cross-linked acrylate polymer.

3. The water swellable semi-conductive material according to claim 1, wherein the superabsorbent polymeric matrix comprises a cross-linked acrylate polymer matrix and wherein the carbon black particles are dispersed within the cross-linked acrylate polymer matrix to form a conductive pathway within the cross-linked acrylate polymer matrix.

4. The water swellable semi-conductive material according to claim 1, wherein the superabsorbent polymeric matrix is a coating positioned on top of the first or second semi-conductive layer.

5. The water swellable semi-conductive material according to claim 1, wherein the semi-conductive water swellable polymeric layer is formed from application of an aqueous composition comprising an acrylate polymer or acrylate pre-polymer and the conductive particles to the first or second semi-conductive layer, followed by drying the aqueous composition to form the superabsorbent polymeric matrix having conductive particles dispersed therein.

6. The water swellable semi-conductive material according to claim 5, wherein the conductive particles are present in the aqueous composition in an amount from 5 percent by weight to 50 percent by weight.

7. The water swellable semi-conductive material according to claim 5, wherein the conductive particles are present in the aqueous composition in an amount of about 25 percent by weight.

8. The water swellable semi-conductive material according to claim 1, wherein the first and second semi-conductive layers comprise carbon black particles.

9. The water swellable semi-conductive material according to claim 1, wherein the first and second semi-conductive layers comprise carbon black particles having a particle size of about 150 μm to about 400 μm.

10. The water swellable semi-conductive material according to claim 1, wherein the substrate is impregnated with super conductive particles to form the first and second semi-conductive layers positioned on opposing surfaces of the substrate.

11. The water swellable semi-conductive material according to claim 1, wherein the water swellable semi-conductive material is a multi-layer tape, the multi-layer tape comprising:
   a first layer comprising the substrate and the first and second semi-conductive layers, wherein the substrate is an elongated material, the elongated material having first and second opposing surfaces, and the first and second semi-conductive layers are positioned on the first and second opposing surfaces of the substrate; and
   a second layer comprising the semi-conductive water swellable polymeric layer, wherein the second layer is positioned on one of the first or second semi-conductive layers.

12. The water swellable semi-conductive material according to claim 11, wherein the elongated material is a woven fabric.

13. The water swellable semi-conductive material according to claim 11, wherein the elongated material is a polymeric material.

14. The water swellable semi-conductive material of claim 1, wherein a thickness of the water swellable semi-conductive material is less than about 0.40 mm.

15. The water swellable semi-conductive material of claim 1, wherein a thickness of the water swellable semi-conductive material is less than about 0.15 mm.

16. A water-resistant cable, comprising:

a conductor; and a water swellable semi-conductive material placed in connection with the conductor, the water swellable semi-conductive material comprising:

a substrate having first and second opposing faces;

first and second semi-conductive coatings positioned on opposing faces of the woven substrate; and a semi-conductive water swellable polymeric layer positioned on an outer surface of one of the first or second semi-conductive coatings, the semi-conductive water swellable polymeric layer comprising conductive particles dispersed within a superabsorbent polymeric matrix, wherein the conductive particles comprise carbon black particles having a particle mesh of about 0.06 mm to about 0.25 mm.

17. The water-resistant cable according to claim 16, wherein the conductor is an electrical conductor.

18. The water-resistant cable according to claim 16, wherein the conductor is an electrical cable, and the water swellable semi-conductive material is in the form of a tape applied to the electrical cable.

19. A method of making a water swellable semi-conductive material, the method comprising:

providing a substrate;

applying a semi-conductive coating to the substrate to form a semi-conductive substrate;

applying an aqueous composition comprising an acrylate polymer or acrylate pre-polymer and conductive particles to the semi-conductive substrate; and drying the aqueous composition on the semi-conductive substrate and cross-linking the acrylate polymer or acrylate pre-polymer to form a semi-conductive water swellable polymeric layer positioned on the semi-conductive substrate, wherein the semi-conductive water swellable polymeric layer is comprised of a crosslinked superabsorbent polymer matrix having conductive particles dispersed therein, wherein the conductive particles comprise carbon black particles having a particle mesh of about 0.06 mm to about 0.25 mm.

20. The method according to claim 19, wherein the semi-conductive coating is applied to opposing surfaces of the substrate as a coating.

21. The method according to claim 19, wherein the semi-conductive coating is impregnated within the substrate.

22. The method of claim 19, wherein the aqueous composition is applied to one side of the substrate.

23. The method of claim 19, wherein the aqueous composition is applied to both sides of the substrate.

24. The method of claim 19, wherein the aqueous composition comprises separate components that are mixed together prior to application.

* * * * *